(12) United States Patent
Jung et al.

(10) Patent No.: US 12,157,449 B2
(45) Date of Patent: *Dec. 3, 2024

(54) SYSTEM AND METHOD FOR PREDICTING NEGATIVE PRESSURE OF BRAKE BOOSTER OF VEHICLE

(71) Applicants: Hyundai Motor Company, Seoul (KR); Kia Corporation, Seoul (KR); Hyundai Kefico Corporation, Gunpo-si (KR)

(72) Inventors: Tae Hun Jung, Seoul (KR); Hyun Sung Park, Hwaseong-si (KR); Young-Jin Kim, Seoul (KR)

(73) Assignees: Hyundai Motor Company, Seoul (KR); Kia Corporation, Seoul (KR); Hyundai Kefico Corporation, Gunpo-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,028

(22) Filed: Nov. 14, 2023

(65) Prior Publication Data

US 2024/0092335 A1 Mar. 21, 2024

Related U.S. Application Data

(63) Continuation of application No. 17/135,669, filed on Dec. 28, 2020, now Pat. No. 11,851,039.

(30) Foreign Application Priority Data

Dec. 30, 2019 (KR) .......................... 10-2019-0178317
Apr. 27, 2020 (KR) .......................... 10-2020-0050755

(51) Int. Cl.
*B60T 17/22* (2006.01)
*B60H 1/00* (2006.01)
(Continued)

(52) U.S. Cl.
CPC ........ *B60T 17/221* (2013.01); *B60H 1/00978* (2013.01); *F02N 11/0814* (2013.01);
(Continued)

(58) Field of Classification Search
CPC ............... B60T 17/221; B60T 2210/30; B60T 2220/04; B60T 2250/00; B60T 2270/413;
(Continued)

(56) References Cited

U.S. PATENT DOCUMENTS 6,305,757 B1 10/2001 Ohsake et al.
6,393,345 B1 5/2002 Kerns et al.
(Continued)

FOREIGN PATENT DOCUMENTS

CN 105697162 A 6/2016
CN 110621526 A 12/2019
(Continued)

*Primary Examiner* — Kurt Philip Liethen
(74) *Attorney, Agent, or Firm* — Morgan, Lewis & Bockius LLP

(57) ABSTRACT

A system for predicting a negative pressure of a brake booster of a vehicle includes: a driving information detector detecting driving information related to driving of the vehicle; and a controller determining a negative pressure of an intake manifold based on a pressure of the intake manifold and an atmospheric pressure which is the driving information and including a booster negative pressure predictor predicting the negative pressure of the brake booster by integrating over time a change rate according to a charging rate and a discharging rate of the negative pressure determined using a negative pressure of the brake booster determined in a previous cycle according to a logic for predicting the negative pressure of the brake booster and the negative pressure of the intake manifold of a current cycle and an imitated brake pedal force signal of the current cycle imitating an acceleration of the vehicle.

20 Claims, 11 Drawing Sheets

(51) Int. Cl.
  *F02N 11/08* (2006.01)
  *G05B 13/04* (2006.01)
(52) U.S. Cl.
  CPC ........ *G05B 13/048* (2013.01); *B60T 2210/30* (2013.01); *B60T 2220/04* (2013.01); *B60T 2250/00* (2013.01); *B60T 2270/413* (2013.01)
(58) Field of Classification Search
  CPC ... B60T 17/22; B60T 13/565; B60H 1/00978; F02N 11/0814; F02N 11/0822; F02N 2200/0807; G05B 13/048
  See application file for complete search history.

(56) References Cited

U.S. PATENT DOCUMENTS

| | | |
|---|---|---|
| 6,741,918 B2 | 5/2004 | Kerns et al. |
| 6,990,858 B2 | 1/2006 | Kerns et al. |
| 8,726,872 B2 | 5/2014 | White et al. |
| 10,899,354 B2 * | 1/2021 | Ohmura ................ B60W 10/06 |
| 11,458,804 B2 * | 10/2022 | Jung .................... B60H 1/3208 |
| 2014/0110994 A1 | 4/2014 | Gruber et al. |
| 2017/0106870 A1 * | 4/2017 | Moore ............ B60W 30/18109 |
| 2020/0180397 A1 | 6/2020 | Jung |
| 2020/0398851 A1 * | 12/2020 | Ohmura ................ B60W 10/06 |

FOREIGN PATENT DOCUMENTS

| | | |
|---|---|---|
| EP | 1114927 B1 | 7/2006 |
| EP | 0982211 B1 | 2/2007 |
| JP | 3787223 B2 | 6/2006 |
| JP | 2011016499 A | 1/2011 |
| WO | WO 2011162382 A1 | 12/2011 |

\* cited by examiner

SYSTEM AND METHOD FOR PREDICTING NEGATIVE PRESSURE OF BRAKE BOOSTER OF VEHICLE

CROSS-REFERENCE TO RELATED APPLICATION

The present application is a Continuation of U.S. patent application Ser. No. 17/135,669, filed Dec. 28, 2020, which claims priority to Korean Patent Application No. 10-2019-0178317, filed on Dec. 30, 2019 and to Korean Patent Application No. 10-2020-0050755, filed Apr. 27, 2020, the entire contents of which is incorporated herein for all purposes by these references.

BACKGROUND OF THE INVENTION

Field of the Invention

The present invention relates to a brake booster negative pressure prediction system and a method thereof, and more particularly, to a system and a method for predicting a negative pressure of a brake booster of a vehicle capable of improving cooling performance and braking performance of the vehicle in which a brake booster sensor and a brake pedal force sensor are omitted.

Description of Related Art

In general, when a brake negative pressure stored in a brake booster of a vehicle is insufficient, a brake pedal of the vehicle is hardened so that a risk of an accident increases. To improve the present problem, a logic to recover the brake negative pressure by stopping an operation of various auxiliary devices such as an air conditioner (A/C) is applied in a situation where the brake negative pressure is insufficient.

A compressor included in the air conditioner affects an engine load of the vehicle because the compressor utilizes a power of an engine of the vehicle. When the brake negative pressure falls below a certain value, an operation of the air conditioner is stopped or cut to secure a driving power required for the brake negative pressure.

The brake negative pressure is a pressure stored in an actual brake booster and an actual measured value measured using a real booster sensor. However, to perform the control for stopping an operation of the air conditioner, many manufacturers use a negative pressure of an intake manifold of the vehicle, which generates a negative pressure of the brake booster, instead of using the real booster sensor due to problems such as cost increase. The negative pressure of the intake manifold means a difference between an atmospheric pressure and a pressure of the intake manifold.

However, in the case of using the intake manifold negative pressure of the intake manifold, an operation of the air conditioner is frequently stopped because the negative pressure of the intake manifold is determined less even when sufficient pressure is stored in the brake booster.

When a vehicle that does not have the booster sensor raises a reference pressure for the control for stopping an operation of the air conditioner using the negative pressure of the intake manifold, there is a problem that cooling performance deteriorates due to frequent stop of the air conditioner. When the reference pressure is lowered, a frequency of stop of the air conditioner is decreased, but braking performance deteriorates.

Therefore, the control for stopping the operation of the air conditioner using the negative pressure of the intake manifold needs to be corrected.

The information included in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a system and a method for predicting a negative pressure of a brake booster of a vehicle configured for improving cooling performance and braking performance of the vehicle through a logic for predicting a negative pressure of a brake booster that utilizes a charging rate and a discharging rate of the negative pressure generated based on a negative pressure of an intake manifold and an imitated pedal force signal brake of the vehicle which does not include a brake booster sensor and a brake pedal force sensor.

An exemplary embodiment of the present invention may provide the system for predicting the negative pressure of the brake booster of the vehicle, including: a driving information detector configured to detect driving information related to the vehicle according to driving of the vehicle; and a controller engaged to the driving information detector and configured to determine a negative pressure of an intake manifold based on a pressure of the intake manifold and an atmospheric pressure which is the driving information and including a booster negative pressure predictor configured to predict the negative pressure of the brake booster by integrating over time a change rate according to a charging rate and a discharging rate of the negative pressure determined using a negative pressure of the brake booster determined in a previous cycle according to a logic for predicting the negative pressure of the brake booster and the negative pressure of the intake manifold of a current cycle and an imitated brake pedal force signal of the current cycle imitating an acceleration of the vehicle.

The controller may be configured to generate an acceleration inflection recognition signal by crossing the imitated brake pedal force signal over time and a reference line which is a zero crossing.

The controller may be configured to correct the charging rate and the discharge rate based on the acceleration inflection recognition signal.

When a predicted negative pressure of the brake booster is less than or equal to a reference negative pressure of a control for stopping an operation of an air conditioner of the vehicle, the controller may be configured to determine that the predicted negative pressure of the brake booster is insufficient to stop the operation of the air conditioner.

The driving information detector may be configured to detect the driving information from at least one of a vehicle speed sensor, a vehicle acceleration sensor, a speed stage sensor, an accelerator pedal sensor, a brake pedal operation sensor, a timer, and an atmospheric pressure sensor.

The booster negative pressure predictor may be configured to collect the negative pressure of the intake manifold and the driving information and to generate the negative pressure of the brake booster predicted in a cycle of a time period.

The booster negative pressure predictor may include: a charging model module configured to determine a first differential pressure over time using the negative pressure of the brake booster determined in the previous cycle and the negative pressure of the intake manifold of the current cycle; a discharging model module configured to take a difference between the negative pressure of the brake booster determined in the previous cycle and the negative pressure of the intake manifold of the current cycle as a basic factor, and to compensate for the basic factor using the imitated brake pedal force signal to determine a second differential pressure over time; a summing module configured to determine a change rate by adding a discharging rate of the negative pressure of the brake booster corresponding to the second differential pressure to a charging rate of the negative pressure of the brake booster corresponding to the first differential pressure; and an integration module configured to integrate the change rate over time and to output the predicted negative pressure of the brake booster.

The charging rate of the negative pressure of the brake booster according to the first differential pressure may be output as a positive value, and the discharging rate of the negative pressure of the brake booster according to the second differential pressure may be output as a negative value.

The charging model module may be configured to determine the charging rate using a control map using the first differential pressure as an input value thereof.

The discharging model module may be configured to determine a multiplication factor for correcting the discharging rate using a correction map using a displacement change amount of the imitated brake pedal force as an input value thereof.

The discharging model module may be configured to use an additional correction amount according to a repetition frequency of a zero crossing generated when repeated braking due to an on state and an off state of a brake operation signal continuously occurs to increase the discharging rate.

The discharging model module may be configured to use an additional correction amount to increase the discharging rate when the discharging model module continuously detects that the acceleration of the vehicle or a speed of the vehicle has an amplitude greater than or equal to a reference amplitude.

The integration module may be configured to feedback the predicted negative pressure of the brake booster to the charging model module and the discharging model module so that the predicted negative pressure is used to determine a charging rate and a discharging rate of a next cycle generated after the current cycle.

The controller may be configured to restart the vehicle in a state in which a start of the vehicle is stopped by an idle stop and go (ISG) system when the predicted negative pressure of the brake booster is less than or equal to a reference negative pressure.

An exemplary embodiment of the present invention may provide the method for predicting the negative pressure of the brake booster of the vehicle, including: a) collecting, by a controller, driving information related to the vehicle according to driving of the vehicle to determine an imitated brake pedal force signal imitating change of an acceleration of the vehicle and a negative pressure of an intake manifold; b) determining, by the controller, a first differential pressure over time using a negative pressure of the brake booster determined in a previous cycle and the negative pressure of the intake manifold of a current cycle; c) taking, by the controller, a difference between the negative pressure of the brake booster determined in the previous cycle and the negative pressure of the intake manifold of the current cycle as a basic factor to determine a second differential pressure over time by compensating for the basic factor using the imitated brake pedal force signal; and d) determining, by the controller, a change rate by adding a discharging rate of the negative pressure of the brake booster corresponding to the second differential pressure to a charging rate of the negative pressure of the brake booster corresponding to the first differential pressure to predict the negative pressure of the brake booster by integrating the change rate over time.

Step a) may include: generating, by the controller, the imitated brake pedal force signal over time by filtering an acceleration change signal of the vehicle in an operation section of a brake of the vehicle; and generating, by the controller, an acceleration inflection recognition signal by crossing the imitated brake pedal force signal and a reference line which is a zero crossing.

Step b) may include: setting, by the controller, an initial negative pressure of the brake booster generated when the previous cycle does not exist as a value less than the negative pressure of the intake manifold.

Step b) may include: determining, by the controller, the charging rate using a control map using the first differential pressure as an input value thereof.

Step c) may include: determining, by the controller, a multiplication factor for correcting the discharging rate using a correction map using a displacement change amount of the imitated brake pedal force as an input value thereof.

The method for predicting the negative pressure of the brake booster of the vehicle may further include: after step d), restarting, by the controller, the vehicle in a state in which a start of the vehicle is stopped by an idle stop and go (ISG) system when the predicted negative pressure of the brake booster is less than or equal to a reference negative pressure.

The system and the method for predicting the negative pressure of the brake booster of the vehicle according to the exemplary embodiment of the present invention may implement the logic for predicting the negative pressure of the brake booster so that the exemplary embodiment of the present invention improves cooling performance and braking performance of the vehicle without cost increase due to addition of hardware.

The exemplary embodiment of the present invention may determine the negative pressure of the brake booster based on the charging rate and the discharging rate modeled according to a change of the imitated brake force signal imitating a change in acceleration of the vehicle so that the exemplary embodiment of the present invention improves accuracy of the negative pressure of the brake booster to a level similar to a level of an actual measured value of the brake booster sensor.

Furthermore, the exemplary embodiment of the present invention may forcibly reduce a predicted value of the negative pressure of the brake booster by detecting a repeated braking situation in which the brake operation signal is continuously changed and an acceleration signal of the vehicle is continuously changed more than or equal to a reference amplitude so that the exemplary embodiment of the present invention prevents a failure in which the predicted value exceeds the actual measured value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
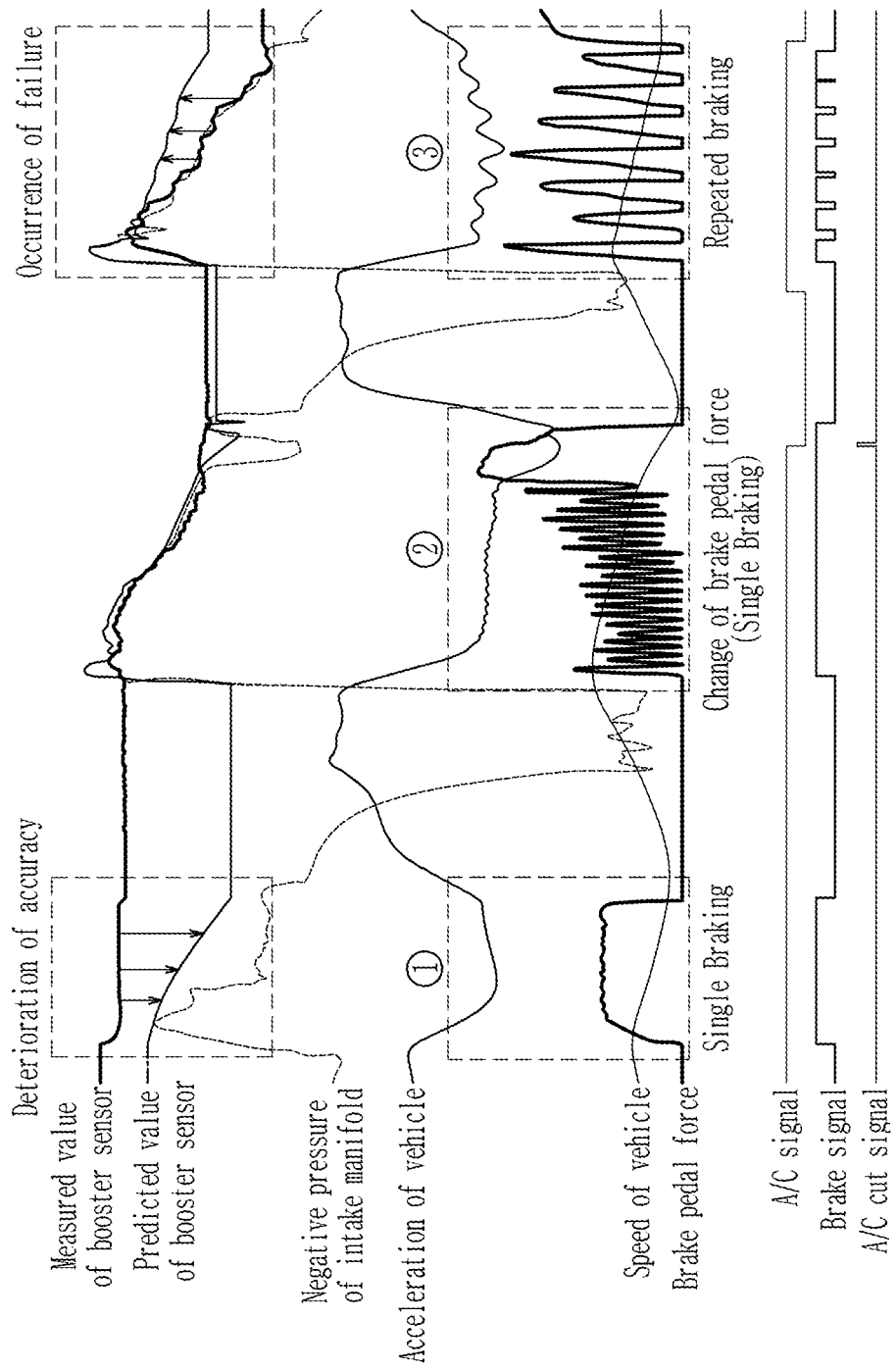
FIG. 1 is a graph explaining prediction limit of a virtual brake negative pressure.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. Furthermore, the terms "-er", "-or" and "module" described in the specification mean units for processing at least one function and operation and may be implemented by hardware components or software components and combinations thereof.

Throughout the specification, terms such as "first", "second", "A", "B", etc. may be used to describe various elements, but the elements may not be limited by the terms. These terms are intended to distinguish one element from other elements, but the nature and the order or sequence of the elements is not limited by those terms.

Throughout the specification, a brake pedal force (or a brake pedal effort) and a brake pedal pressure have a same meaning, and a pedal means a brake pedal unless otherwise stated.

Throughout the specification, a vehicle refers to a vehicle in which a brake booster sensor for measuring a negative pressure of the brake booster and a brake pedal force sensor (or a brake pedal pressure sensor) for measuring a pressure of the brake pedal are not provided.

A system for predicting a negative pressure of a brake booster of the vehicle not having the brake pedal force sensor (or a device configured for predicting the negative pressure of the brake booster of the vehicle) and a method for predicting the negative pressure of the brake booster of the vehicle according to various exemplary embodiments of the present invention will now be described in detail with reference to the drawings.

A method of deriving a value of a virtual brake booster sensor for solving a problem that occurs in a control for stopping an operation of an air conditioner (A/C) of a vehicle using a negative pressure of an intake manifold of the vehicle will be referred to as follows.

The method may derive the virtual brake booster sensor value by modeling a change of the negative pressure of the brake booster according to the negative pressure of the intake manifold of the vehicle and an acceleration of the vehicle so that the method reduces a frequency of stop of the air conditioner.

However, since the method utilizes only the negative pressure of the intake manifold and the acceleration of the vehicle as basic factors for predicting a brake negative pressure (or a pressure of the brake booster), it is difficult to predict a change in the brake negative pressure due to a change of a brake pedal operation pattern of the vehicle when the vehicle decelerates with the acceleration.

FIG. 1 is a graph explaining prediction limit of the virtual brake negative pressure.

Referring to FIG. 1, to verify the method of deriving the virtual brake booster sensor value (or a predicted value of the brake booster sensor), the virtual booster sensor value and an actual booster sensor value according to a change in the brake pedal operation pattern of the vehicle are compared. The actual booster sensor value may be a measured value of the brake booster sensor.

Conditions ☐, ☐, and ☐ of FIG. 1 represent different booster pressure changes according to the change in the brake pedal operation pattern in a situation where the vehicle is decelerated with similar acceleration.

The condition ☐ shown as ①  in FIG. 1 is a case where the brake pedal of the vehicle is constantly pressed during a single brake operation. The condition ☐ shown as ☐ in FIG. 1 is a case where a pressure of the brake pedal is frequently changed during a single brake operation. The condition ☐ shown as ☐ in FIG. 1 is a case where an on operation and an off operation of the brake pedal are repeated. It is ideal that the virtual booster sensor value (or the predicted value) is close to the actual booster sensor value (or the measured value). A degree of similarity is defined as accuracy. A risk situation in which the predicted value exceeds or reverses the measured value in a situation where the measured value is insufficient is defined as a failure. Considering safety of the vehicle, the accuracy has to be high and the failure does not exist or has to be 0%.

In the case of the condition ☐, the measured value hardly decreases, but the predicted value determined based on the negative pressure of the intake manifold and the acceleration rapidly decreases. Thus, the accuracy deteriorates. In the case of the condition ☐, the measured value and the predicted value is similar. In the case of the condition ☐, the predicted value exceeds the measured value so that the failure occurs.

To solve the above problem, the negative pressure of the brake booster may be predicted using a charging rate and a discharging rate of the negative pressure generated based on the negative pressure of the intake manifold and a signal of the brake pedal force of the vehicle which does not include a brake booster sensor so that accuracy of prediction of the negative pressure of the brake booster is improved. However, the above improvement method may be applied to only a vehicle including the brake pedal force sensor outputting the brake pedal force signal.

Accordingly, the system and the method for predicting the negative pressure of the brake booster applicable to a vehicle without the brake booster sensor and the brake pedal force sensor.

Figure 2:
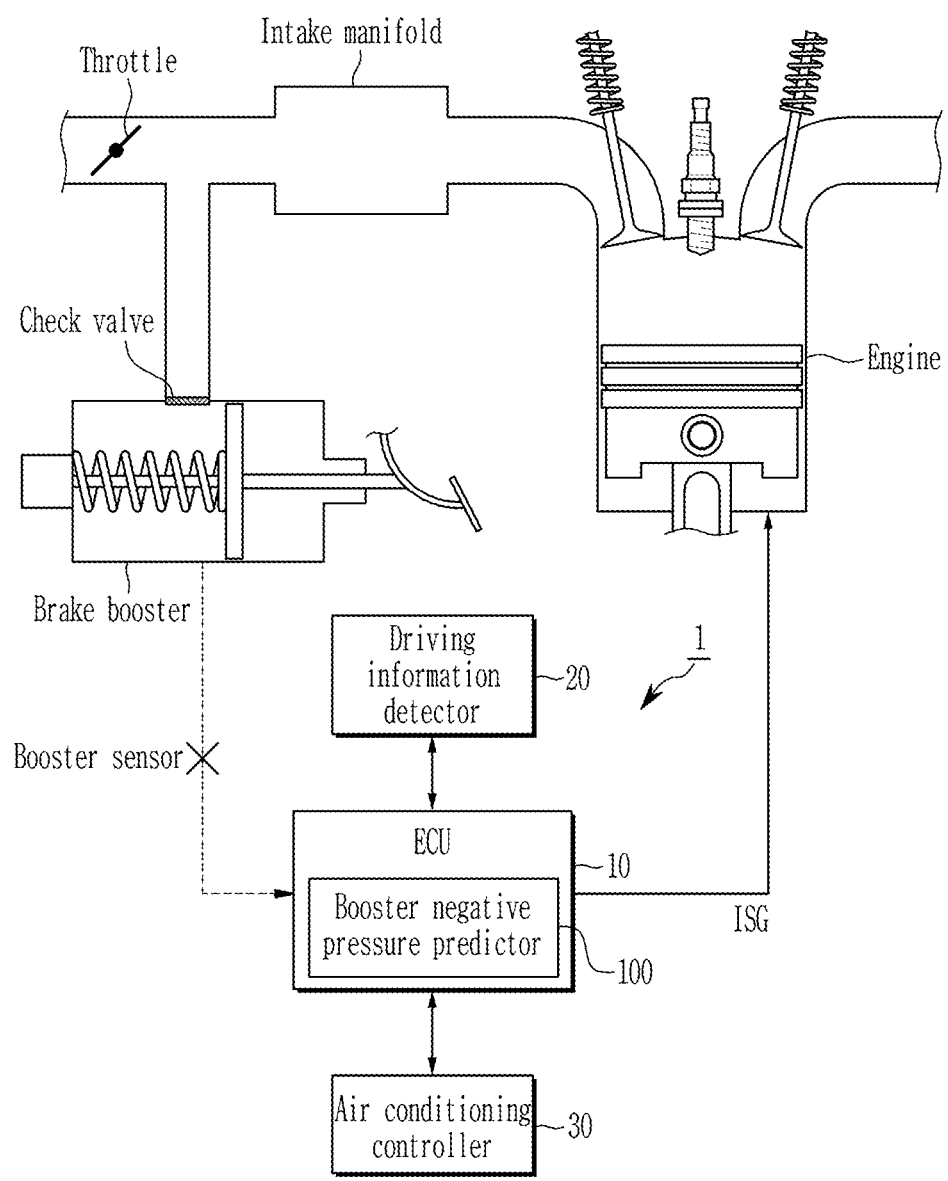
FIG. 2 shows a configuration of a system for predicting a negative pressure of a brake booster of a vehicle according to various exemplary embodiments of the present invention.

FIG. 2 shows a configuration of the system for predicting the negative pressure of the brake booster of the vehicle according to various exemplary embodiments of the present invention.

Referring to FIG. 2, the system for predicting the negative pressure of the brake booster of the vehicle 1 may be applied to the vehicle in which the brake booster sensor and the brake pedal force sensor is omitted, and may include a controller (e.g., an engine control unit (ECU)) 10 including a booster negative pressure predictor 100, a driving information detector 20, and an air conditioning controller 30.

The controller 10 may determine a virtual negative pressure of the brake booster according to a logic for predicting the negative pressure of the brake booster, and may use driving information detected according to an operation of the vehicle to perform a control for reducing a frequency of stop of an air conditioner (A/C) of a vehicle using a predicted negative pressure of the brake booster.

The controller 10 may determine the negative pressure of the intake manifold by subtracting a pressure of the intake manifold from an atmospheric pressure which is the driving information. The negative pressure of the intake manifold may be stored in the brake booster. The controller 10 may derive a virtual brake booster sensor value by modeling or predicting a change in a negative pressure of the brake booster according to the negative pressure of the intake manifold of the vehicle and acceleration of the vehicle.

The controller 10 may include the booster negative pressure predictor 100 that predicts a negative pressure of the brake booster similar to an actual measured value or a measured value based on the logic for predicting the negative pressure of the brake booster. The booster negative pressure predictor 100 may predict a current negative pressure k of the brake booster by integrating over time a change rate according to a charging rate and a discharging rate modeled (or determined) using a negative pressure k−1 of the brake booster determined in a previous cycle according to the logic for predicting the negative pressure of the brake booster and a negative pressure of the intake manifold of a current cycle and an imitated brake pedal force signal of the current cycle imitating change of acceleration of the vehicle.

The system for predicting the negative pressure of the brake booster of the vehicle 1 may not directly measure a pedal force applied to the brake pedal of the vehicle by a driver of the vehicle because the system is applied to the vehicle in which the brake pedal force sensor is omitted.

Therefore, for the system for predicting the negative pressure of the brake booster of the vehicle 1 to predict a reliable pedal force, a method of indirectly predicting the pedal force is required. The method of indirectly predicting the pedal force may be implemented by a function or software of the controller 10.

The controller 10 may filter a change in acceleration of the vehicle over time to generate an acceleration inflection recognition signal that has a tendency similar to the brake pedal force signal measured by the brake pedal force sensor. In an exemplary embodiment of the present invention, since the acceleration inflection recognition signal is similar to the brake pedal effort signal measured by the brake pedal force sensor, the acceleration inflection recognition signal may be defined as the imitated brake pedal force signal.

Figure 3:
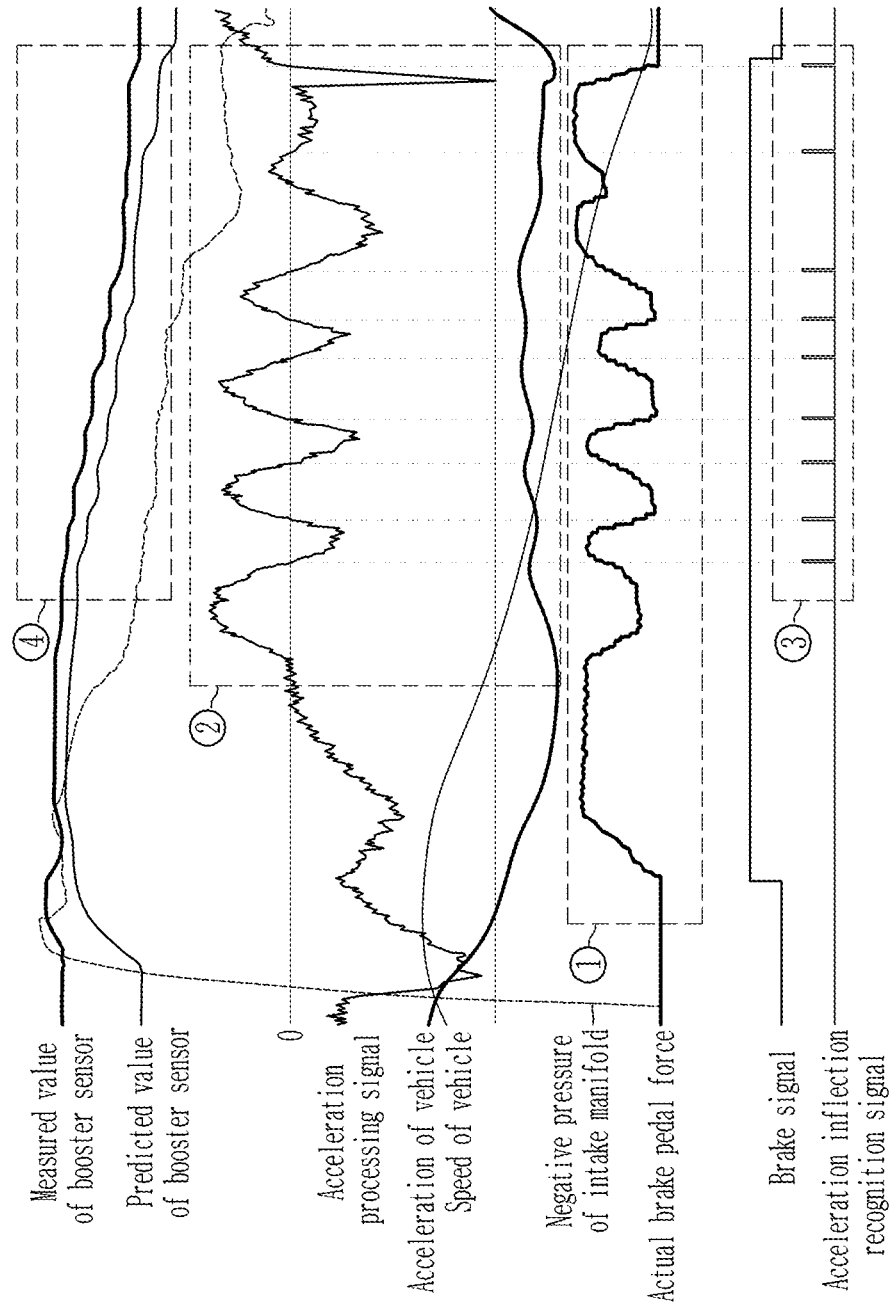
FIG. 3 is a graph illustrating a method of imitating a brake pedal force signal according to various exemplary embodiments of the present invention.

FIG. 3 is a graph illustrating a method of imitating the brake pedal force signal according to various exemplary embodiments of the present invention.

Referring to FIG. 3, the vehicle that does not include the brake pedal force signal may filter an acceleration signal of the vehicle over time to generate an acceleration processing signal such as ☐. The acceleration processing signal may be similar to a change in an actual brake pedal force of the vehicle such as ☐. The ☐ may represent a state in which the pedal force is frequently changed under a single brake pedal operation. The ☐ may be an imitated brake pedal force signal to imitate the change in the actual brake pedal force.

When the acceleration processing signal such as ☐ crosses a predetermined reference line which is 0 (or a zero crossing), the acceleration inflection recognition signal such as ☐ may be generated. The zero crossing may be a reference point (e.g., 0) for determining a change of the acceleration processing signal used when a discharging rate of the negative pressure of the brake booster is corrected during prediction of the negative pressure of the brake booster as shown in ④. The zero crossing may have an allowable error of ±0.01. When the acceleration inflection recognition signal is used, additional decompression of the predicted pressure of the brake booster may be performed.

The controller 10 may generate the imitated brake pedal force signal to predict the virtual negative pressure k of the brake booster as shown in ④ through the booster negative pressure predictor 100.

Figure 4:
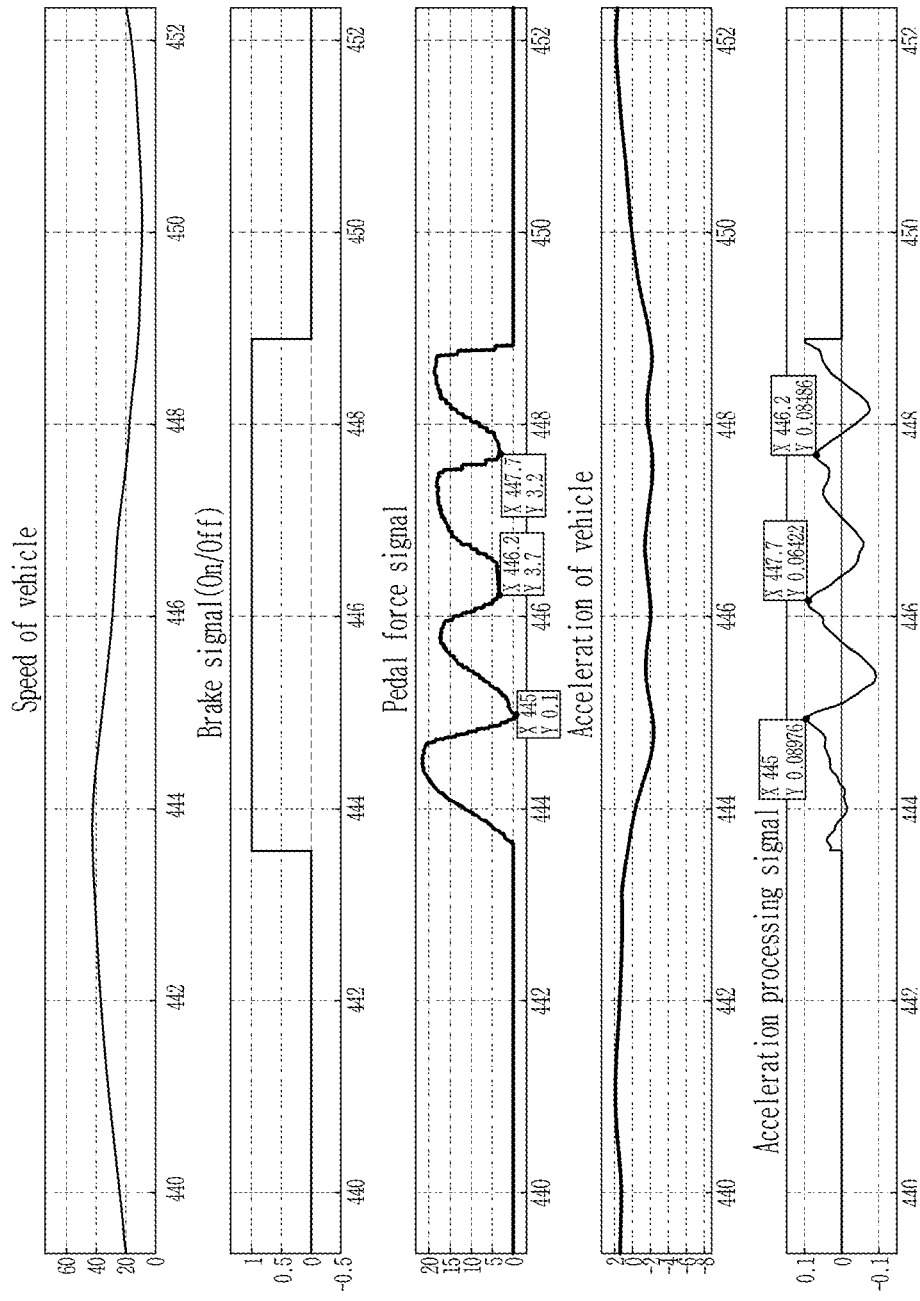
FIG. 4 illustrates an acceleration signal of a vehicle processed by imitating a phase of the brake pedal force signal according to various exemplary embodiments of the present invention.

FIG. 4 illustrates the acceleration signal of the vehicle processed by imitating a phase of the brake pedal force signal according to various exemplary embodiments of the present invention.

FIG. 5A, FIG. 5B, FIG. 6A, and FIG. 6B are graphs explaining a method of processing acceleration of the vehicle according to various exemplary embodiments of the present invention.

Referring to FIG. 4 through FIG. 6, when the driver presses the brake pedal to operate a brake of the vehicle while the vehicle is traveling, acceleration of the vehicle may change according to a degree of application of the brake pedal force. When the brake pedal force increases, acceleration of the vehicle may decrease, and when the brake pedal force decreases, acceleration of the vehicle may increase. Thus, a change in acceleration of the vehicle and a change in the brake pedal force may be correlated.

Figure 5A:
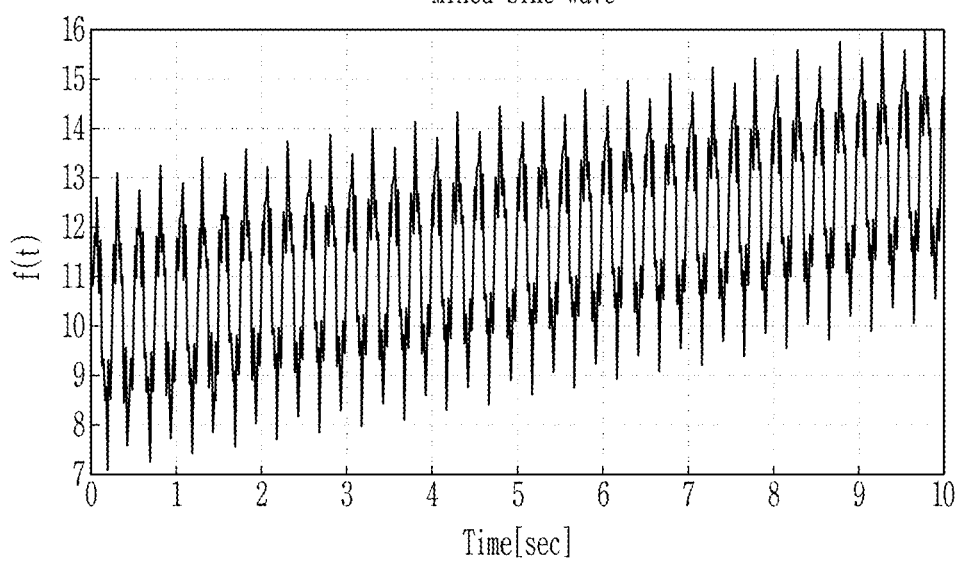
FIG. 5A, FIG. 5B, FIG. 6A, and FIG. 6B are graphs explaining a method of processing acceleration of the vehicle according to various exemplary embodiments of the present invention.

As shown in FIG. 5A, an acceleration signal of the vehicle shown in FIG. 4 may has various combinations of frequencies according to a driving state of the vehicle. Since the acceleration signal has a lot of information including the brake pedal force signal, it is difficult to clearly distinguish the brake pedal force signal from the acceleration signal. In other words, even if the change in the acceleration of the vehicle and the change in the brake pedal force are related to each other, the acceleration signal may not be used as it is because it is difficult to distinguish the brake pedal effort signal from the acceleration signal. Therefore, a process confirming a change of the acceleration signal similar to the brake pedal force signal may be required.

Figure 5B:
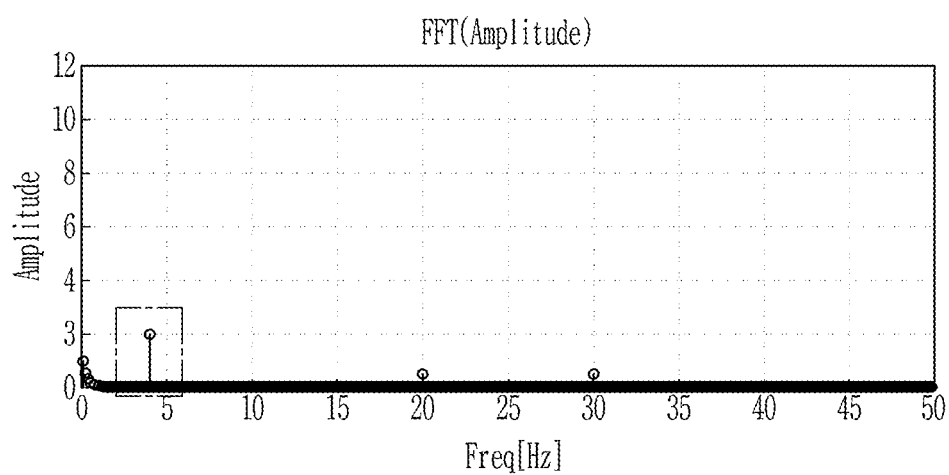
Figure 6A:
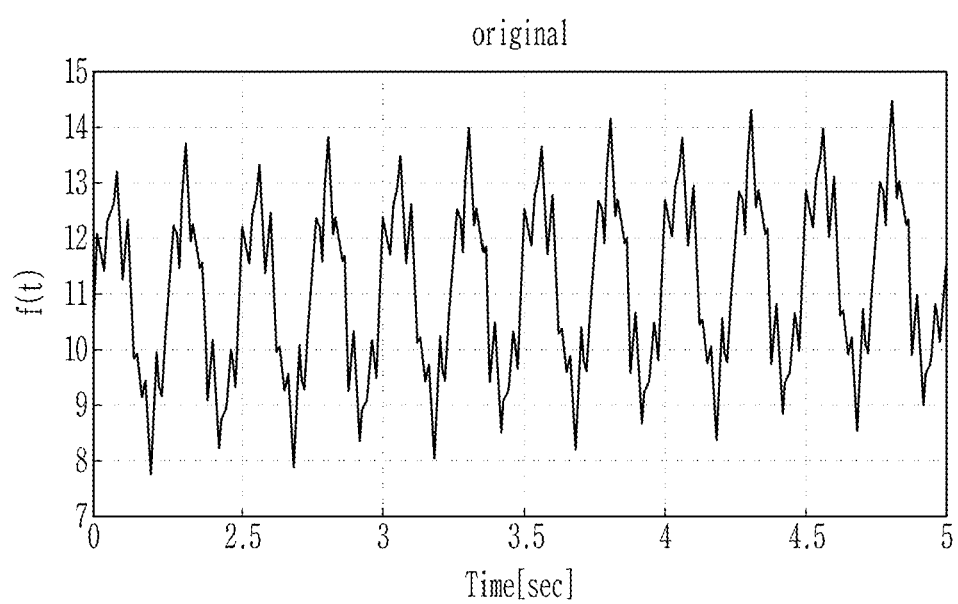
Figure 6B:
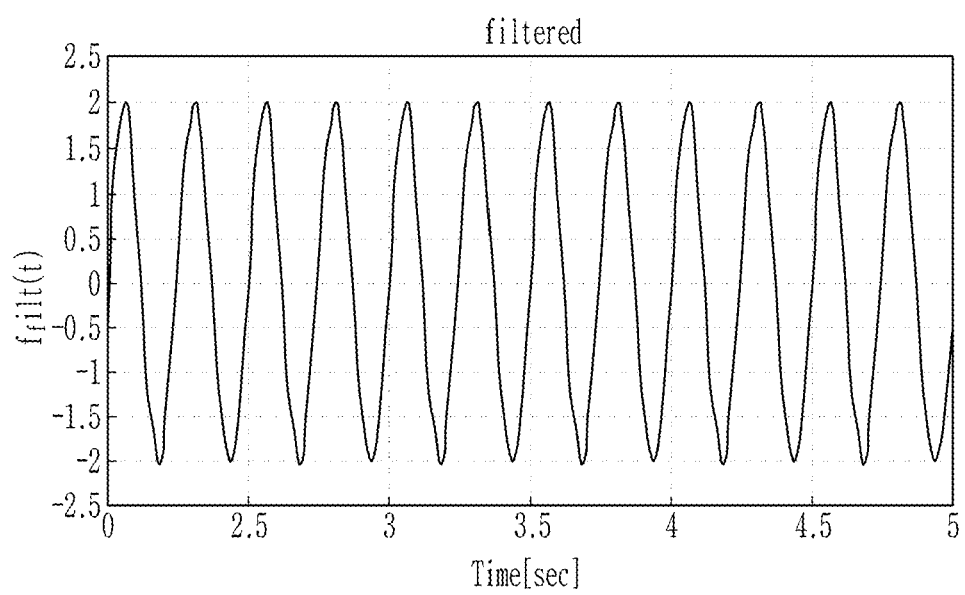

The controller 10 may extract a frequency of the brake of FIG. 6B from the acceleration signal of FIG. 6A by setting a certain frequency region which is generated during the driver's brake operation and is shown in FIG. 5B, and may filter or block the remaining frequencies of the acceleration signal.

In general, during the brake operation, a high frequency region of the acceleration signal may represent a strong noise characteristic of the vehicle, and a low frequency region of the acceleration signal may represent a strong characteristic of the vehicle's driving. Therefore, the controller 10 may set a band filter for the certain frequency region (i.e., the low frequency region) for discriminating the brake pedal force signal from the acceleration signal in the braking operation.

The controller 10 may imitate the brake pedal force signal by extracting only the certain frequency region of the brake through filtering of the acceleration signal collected during the brake operation. The imitated brake pedal force signal may include an overwhelmingly large signal change component due to the brake operation. Thus, as shown in FIG. 4, the acceleration processing signal imitating the phase of the brake pedal force signal may be derived.

As described above, the controller 10 may obtain the acceleration processing signal reflecting a movement of the vehicle due to the brake operation by the filtering method that extracts the frequency region of the brake operation from the acceleration signal over time.

The controller 10 may store various programs and data for driving the booster negative pressure predictor 100 and reducing a frequency of stop of the air conditioner using the booster negative pressure predictor in a memory, and may update data generated according to an operation of the controller.

The controller 10 may store a program of the booster negative pressure predictor 100 in the memory, and may use a negative pressure of the brake booster derived according to execution of the program to reduce the frequency of stop of the air conditioner.

The driving information detector 20 may detect driving information related to the vehicle measured by various sensors and various controllers according to a driving state of the vehicle. The driving information may be data measured by various sensors and controllers, or information processed from measured raw data in a form necessary for control.

For example, the driving information detector 20 may detect the driving information from a vehicle speed sensor, a vehicle acceleration sensor, an intake manifold pressure sensor, a gear stage sensor, an accelerator pedal sensor, a brake pedal sensor (or a brake pedal operation sensor), an altitude sensor, a slope sensor, a timer, or an atmospheric pressure sensor.

The air conditioning controller 30 may control an overall operation of the air conditioner (A/C), and may perform a control for reducing a frequency of stop of the air conditioner according to a signal applied by the controller 10. The air conditioner may include a compressor that compresses refrigerant, a condenser that condenses and liquefies the compressed refrigerant, and a vaporizer that vaporizes the liquefied refrigerant. The compressor, the condenser, and the vaporizer are known elements.

Figure 7:
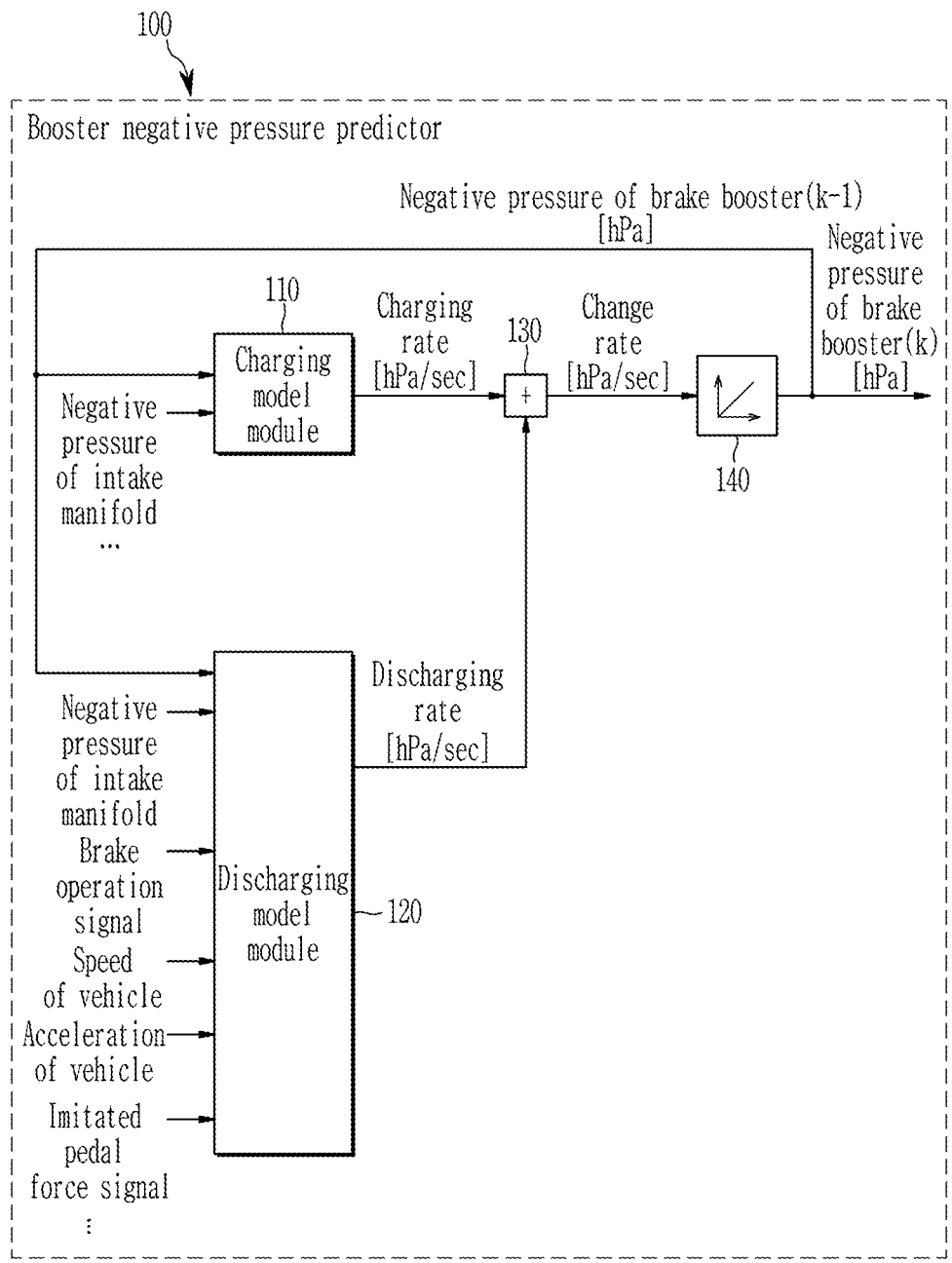
FIG. 7 is a block diagram showing a configuration of a booster negative pressure predictor according to various exemplary embodiments of the present invention.

FIG. 7 is a block diagram showing a configuration of the booster negative pressure predictor according to various exemplary embodiments of the present invention.

Referring to FIG. 7, the booster negative pressure predictor 100 may collect the negative pressure of the intake manifold and the driving information in real time, and may generate the negative pressure k of the brake booster at a cycle of a predetermined time period.

The booster negative pressure predictor 100 may include a charging model module 110 that determines the charging rate and a discharging model module 120 that determines a discharging rate. The booster negative pressure predictor 100 may predict the negative pressure k of the brake booster by integrating the change rate which is a sum of the charging rate and the discharging rate.

The booster negative pressure predictor 100 may include the charging model module (or a filling model module) 110, the discharging model module 120, a summing module 130, and an integration module 140.

The charging model module 110 or the discharging model module 120 may receive the negative pressure k−1 of the brake booster determined in the previous cycle, and the driving information including a negative pressure of the intake manifold, a brake operation signal, a brake pedal force signal, the imitated brake pedal force signal imitating the change in the acceleration of the vehicle, speed of the vehicle, and acceleration of the vehicle of the current cycle.

The charging model module 110 may determine a first differential pressure over time using the negative pressure k−1 of the brake booster modeled (or determined) in the previous cycle and a current negative pressure of the intake manifold. The first differential pressure may be output as a positive value which is the charging rate (hPa/sec) of the booster negative pressure. The charging model module 110 may determine the charging rate (hPa/sec) of the booster negative pressure using a predetermined control map (or a predetermined control lookup table) using the first differential pressure as an input value thereof.

A difference between the current negative pressure of the intake manifold and the negative pressure k−1 of the brake booster modeled or output in the previous cycle may be used as a main input factor. The charging model module 110 may determine the charging rate (hPa/sec) by reflecting additional correction factors referring to the driving information.

The discharging model module 120 may take a difference between the negative pressure k−1 of the brake booster modeled in the previous cycle and the current negative pressure of the intake manifold as a basic factor, and may compensate for the basic factor using the imitated brake pedal force signal to determine a second differential pressure over time. The second differential pressure may be output as a negative value which is the discharging rate (hPa/sec) of the booster negative pressure. The brake pedal force signal may have the compensation value proportional to its change.

The discharging model module 120 may determine a multiplication factor for correcting the discharging rate of the booster negative pressure using a predetermined correction map using a displacement change amount of the imitated brake pedal force as an input value thereof.

The summing module 130 may determine the change rate by adding the discharging rate of the second differential pressure determined in the discharging model module 120 to the charging rate of the first differential pressure determined in the charging model module 110.

The integration module 140 may integrate the change rate determined by the summing module 130 over time to output the predicted negative pressure k of the brake booster.

The integration module 140 may feedback or transmit the predicted negative pressure of the brake booster to the charging model module 110 and the discharging model module 120 so that the predicted negative pressure is used to determine a charging rate and a discharging rate of a next cycle.

When repeated braking due to an on state and an off state of the brake operation signal (or a brake signal) continuously occurs, the discharging model module 120 may reflect or use a predetermined correction amount to increase the discharging rate of the booster negative pressure. In more details, the discharging model module 120 may increase the discharging rate which is the negative value to forcibly reduce the negative pressure k of the brake booster when the discharging model module detects the repeated braking according to a continuous operation of the brake pedal shown as the condition □ of FIG. 1. Thus, the failure may be prevented.

A main factor of the forced reduction of the negative pressure may be a repetition frequency of the zero crossing according to the repeated braking of the brake. A reason for using the repetition of the zero crossing to reduce the failure is that the repeated braking of the brake is not reflected in the acceleration of the vehicle due to inertia of the vehicle when the pedal pressure is repeatedly generated at a high speed. Therefore, the repeated braking of the brake may be reflected in the acceleration of the vehicle by applying a predetermined additional correction amount according to the repetition frequency of the zero crossing.

The discharging model module 120 may reflect or use a predetermined additional correction amount to increase the discharging rate of the booster negative pressure when the discharging model module continuously detects that the acceleration of the vehicle or a speed of the vehicle has an amplitude greater than or equal to a reference amplitude. Control stability of the negative pressure k of the brake booster determined according to the change of the brake pedal force may be secured.

When the negative pressure k of the brake booster predicted by the booster negative pressure predictor 100 is less than or equal to a reference negative pressure of the control for stopping the operation of the air conditioner, the controller 10 may determine that the booster negative pressure is insufficient to stop the operation of the air conditioner.

Based on the configuration of the above-described system for predicting the negative pressure of the brake booster, a method for predicting the negative pressure of the brake booster of the vehicle according to various exemplary embodiments of the present invention will be described.

The controller 10 may be implemented as at least one processor that operates the booster negative pressure predictor 100 using a program. The program may perform each step of the method for predicting the negative pressure of the brake booster of the vehicle according to various exemplary embodiments of the present invention.

Therefore, in the following description of the method for predicting the negative pressure of the brake booster according to various exemplary embodiments of the present invention, the subject or a main agent of the method may be the controller 10, and the method may perform the control for reducing a frequency of stop of the air conditioner using the predicted negative pressure k of the brake booster.

Figure 8:
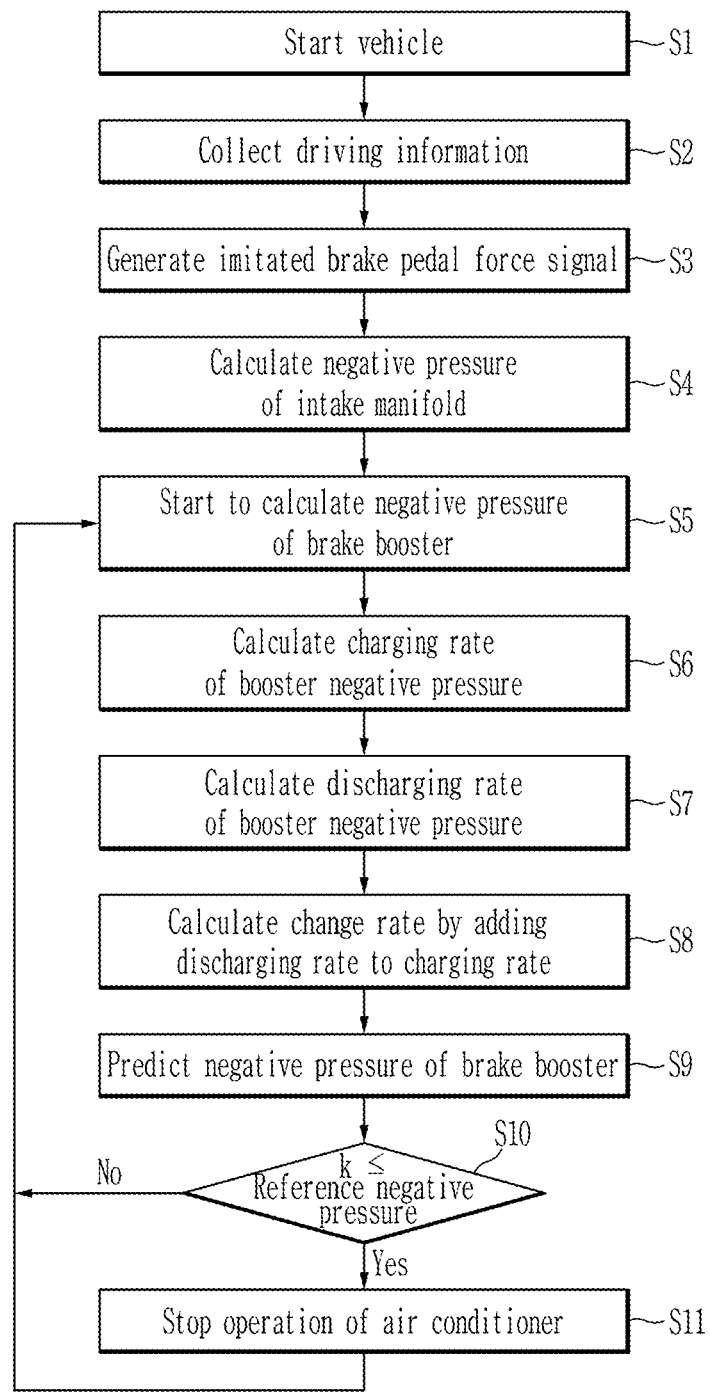
FIG. 8 is a flowchart showing a method for predicting the negative pressure of the brake booster of the vehicle according to various exemplary embodiments of the present invention.

FIG. 8 is a flowchart showing the method for predicting the negative pressure of the brake booster of the vehicle according to various exemplary embodiments of the present invention.

Referring to FIG. 8, the controller 10 of the system for predicting the negative pressure of the brake booster of the vehicle 1 may continuously collect the driving information related to the vehicle from the driving information detector 20 after the vehicle is started (steps S1 and S2). The driving information may include at least one of the atmospheric pressure, the vehicle speed, the vehicle acceleration, an accelerator pedal operation signal, the brake operation signal, an altitude, a slope, and a time according to an operation (or a driving) of the vehicle.

The controller 10 may generate the imitated brake pedal force signal imitating a change in acceleration of the vehicle over time in an operation section of the brake (step S3). The controller 10 may generate the imitated brake pedal force signal over time by filtering the acceleration change signal of the vehicle. The controller 10 may generate the acceleration inflection recognition signal by crossing the acceleration processing signal with the predetermined reference line which is 0 (or the zero crossing).

The controller 10 may determine the negative pressure of the intake manifold by subtracting the pressure of the intake manifold from the atmospheric pressure which is the driving information (step S4).

The controller 10 may operate the timer so that the controller starts to determine the negative pressure k of the brake booster using the driving information, the imitated brake pedal force signal, and the negative pressure of the intake manifold collected in the current cycle and the negative pressure k−1 of the brake booster determined in the previous cycle (step S5). The controller 10 may set an initial negative pressure of the brake booster generated when the previous cycle does not exist as a value less than the negative pressure of the intake manifold.

The controller 10 may determine the first differential pressure over time using the negative pressure k−1 of the brake booster determined in the previous cycle and the current negative pressure of the intake manifold to determine the charging rate of the booster negative pressure (step S6).

The controller 10 may take the difference between the negative pressure k−1 of the brake booster determined in the previous cycle and the current negative pressure of the intake manifold as the basic factor and may compensate for the basic factor using the imitated brake pedal force signal to determine the second differential pressure over time so that the controller determines the discharging rate of the booster negative pressure (step S7). The controller 10 may determine the multiplication factor for correcting the discharging rate of the booster negative pressure using the correction map using the displacement change amount of the imitated brake pedal force as the input value.

The controller 10 may determine the change rate by adding the discharging rate of the second differential pressure to the charging rate of the first differential pressure (step S8).

The controller 10 may integrate the determined change rate over time to generate the predicted negative pressure k of the brake booster (step S9). The controller 10 may store the predicted negative pressure of the brake booster in the memory so that the predicted negative pressure is used to determine a charging rate and a discharging rate of the next cycle.

When the predicted negative pressure k of the brake booster is less than or equal to the reference negative pressure of the control for stopping the operation of the air conditioner (Yes in step S10), the controller 10 may determine that the booster negative pressure is insufficient to stop the operation of the air conditioner (step S11).

After the step S11, the controller 10 may return to the step S5 and may determine a negative pressure of the brake booster of the next cycle until the start of the vehicle is off.

When the predicted negative pressure k of the brake booster exceeds the reference negative pressure of the control for stopping the operation of the air conditioner (No in the step S10), the controller 10 may determine that the booster negative pressure is sufficient not to stop the operation of the air conditioner, and may perform the step S5.

Figure 9:
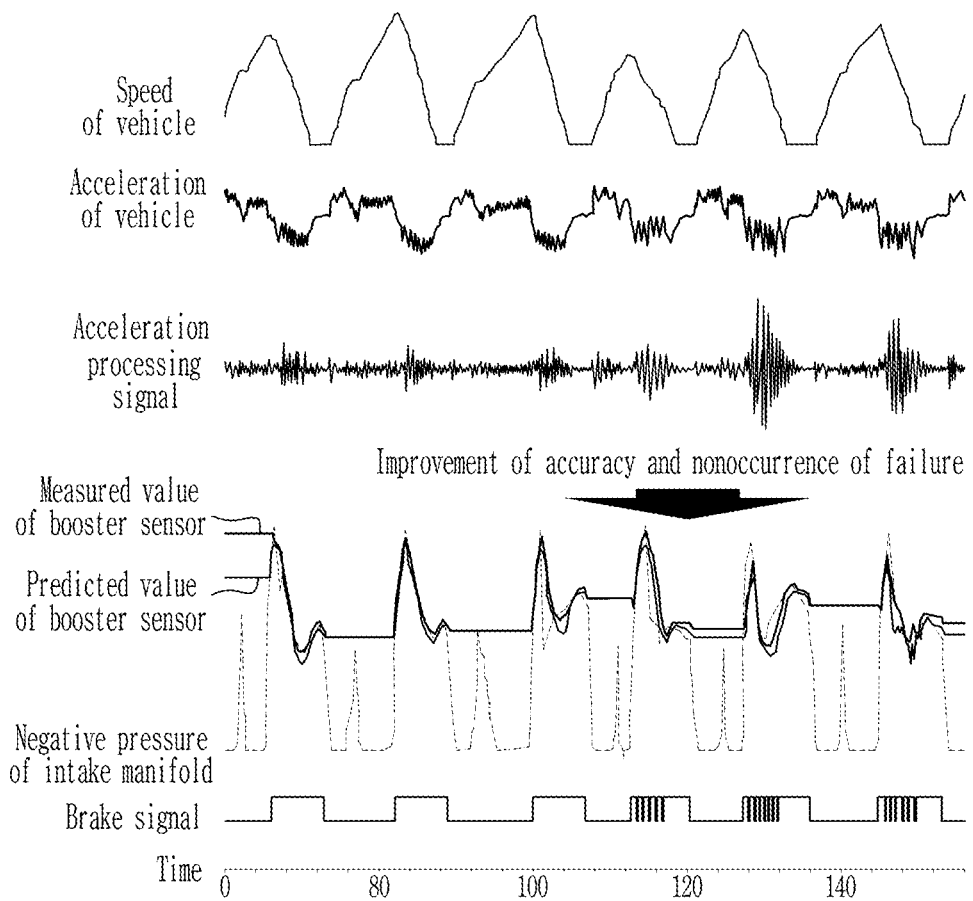
FIG. 9 is a graph showing a result of predicting the negative pressure of the brake booster according to various exemplary embodiments of the present invention.

FIG. 9 is a graph showing a result of predicting the negative pressure of the brake booster according to various exemplary embodiments of the present invention.

FIG. 9 shows a control result using the system for predicting the negative pressure of the brake booster according to various exemplary embodiments of the present invention.

As described referring to FIG. 1, when only the negative pressure of the intake manifold and the acceleration of the vehicle are used as basic factors for prediction of the booster negative pressure, there is a problem that the predicted value is not similar to the measured value so that the accuracy deteriorates or the failure occurs.

Accordingly, the exemplary embodiment of the present invention may output the predicted value of the negative pressure of the brake booster similar to the measured value of the negative pressure of the brake booster using the charging rate and the discharging rate generated based on the imitated brake pedal force, and may improve the accuracy as much as more than or equal to 90%.

As described above, the exemplary embodiment of the present invention may implement the logic for predicting the negative pressure of the brake booster so that the exemplary embodiment of the present invention improves cooling performance and braking performance of the vehicle without cost increase due to addition of hardware.

The exemplary embodiment of the present invention may determine the negative pressure of the brake booster based on the charging rate and the discharging rate modeled according to a change of the imitated brake pedal force signal imitating a change in acceleration of the vehicle so that the exemplary embodiment of the present invention improves accuracy of the negative pressure of the brake booster to a level similar to a level of a measured value of the brake booster sensor.

Furthermore, the exemplary embodiment of the present invention may forcibly reduce the predicted value of the negative pressure of the brake booster by detecting the repeated braking situation in which the brake pedal operation force signal is continuously changed and an acceleration signal of the vehicle is continuously changed more than or equal to the reference amplitude so that the exemplary embodiment of the present invention prevents the failure up to 0%.

The exemplary embodiment of the present invention has been described, but the present invention is not limited to the above described exemplary embodiment of the present invention, and various other modifications are possible.

For example, in the above described exemplary embodiment of the present invention, it has been described that the controller 10 performs the control for reducing a frequency of stop of the air conditioner using the negative pressure of the brake booster predicted by the booster negative pressure predictor 100.

However, the exemplary embodiment of the present invention is not limited thereto, and the booster negative pressure predictor 100 may include a function of a brake booster sensor of an existing vehicle.

In general, a vehicle including an idle stop and go (ISG) system utilizes the brake booster sensor to restart the vehicle when a pressure of the brake booster becomes insufficient after start of the vehicle is stopped by the ISG system. Therefore, when the brake booster sensor is omitted in the vehicle including the ISG system, the vehicle may use the system for predicting the negative pressure of the brake booster of the vehicle 1 according to various exemplary embodiments of the present invention to perform ISG control.

For example, the controller 10 may restart the vehicle when the predicted negative pressure of the brake booster of the step S9 is less than or equal to a reference negative pressure of the ISG control, and the controller may maintain a state in which the start of the vehicle is stopped when the predicted negative pressure of the brake booster exceeds the reference negative pressure.

The exemplary embodiment of the present invention is not implemented only by the aforementioned apparatus or method, and may be implemented by a program for operating a function corresponding to the configuration of the exemplary embodiment of the present invention, a recording medium in which the program is recorded, and the like, and the implementation may be easily realized from the description of the aforementioned exemplary embodiment by those skilled in the art.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for predicting a negative pressure of a brake booster of a vehicle, the system comprising:
   a driving information detector configured to detect driving information related to the vehicle according to driving of the vehicle; and
   a controller operatively connected to the driving information detector and configured to determine a negative pressure of an intake manifold according to a pressure of the intake manifold and the driving information including an atmospheric pressure,
   wherein the controller includes a booster negative pressure predictor configured to predict the negative pressure of the brake booster by integrating over time a change rate according to a charging rate and a discharging rate of the negative pressure of the brake booster determined using a negative pressure of the brake booster determined in a previous cycle according to a logic for predicting the negative pressure of the brake booster and the negative pressure of the intake manifold of a current cycle and an imitated brake pedal force signal of the current cycle imitating an acceleration of the vehicle,
   wherein the controller is configured to control an operation of an air conditioner according to the predicted negative pressure of the brake booster, and
   wherein the booster negative pressure predictor includes:
   a charging model module configured to determine a first differential pressure over time using the negative pressure of the brake booster determined in the previous cycle and the negative pressure of the intake manifold of the current cycle;
   a discharging model module configured to take a difference between the negative pressure of the brake booster determined in the previous cycle and the negative pressure of the intake manifold of the current cycle as a basic factor, and to compensate for the basic factor using the imitated brake pedal force signal to determine a second differential pressure over time;
   a summing module configured to determine the change rate by adding a discharging rate of the negative pressure of the brake booster corresponding to the second differential pressure to the charging rate of the negative pressure of the brake booster corresponding to the first differential pressure; and
   an integration module configured to integrate the change rate over time and to output the predicted negative pressure of the brake booster.

2. The system of claim 1, wherein the controller is further configured to generate an acceleration inflection recognition signal by crossing the imitated brake pedal force signal over time and a reference line which is a zero crossing.

3. The system of claim 2, wherein the controller is further configured to correct the charging rate and the discharging rate according to the acceleration inflection recognition signal.

4. The system of claim 1, wherein in response that the predicted negative pressure of the brake booster is less than or equal to a reference negative pressure of a control for stopping the operation of the air conditioner of the vehicle, the controller is further configured to stop the operation of the air conditioner.

5. The system of claim 1, wherein the driving information detector is further configured to detect the driving information from at least one of a vehicle speed sensor, a vehicle acceleration sensor, a gear stage sensor, an accelerator pedal sensor, a brake pedal operation sensor, a timer, and an atmospheric pressure sensor.

6. The system of claim 1, wherein the booster negative pressure predictor is further configured to collect the negative pressure of the intake manifold and the driving information and to generate the negative pressure of the brake booster predicted in a cycle of a time period.

7. The system of claim 1, wherein the charging rate of the negative pressure of the brake booster according to the first differential pressure is output as a positive value, and the discharging rate of the negative pressure of the brake booster according to the second differential pressure is output as a negative value.

8. The system of claim 1, wherein the charging model module is further configured to determine the charging rate using a control map using the first differential pressure as an input value thereof.

9. The system of claim 1, wherein the discharging model module is further configured to determine a multiplication factor for correcting the discharging rate using a correction map using a displacement change amount of the imitated brake pedal force as an input value thereof.

10. The system of claim 9 wherein the discharging model module is further configured to use an additional correction amount according to a repetition frequency of a zero crossing generated upon determining that repeated braking due to an on state and an off state of a brake operation signal continuously occurs to increase the discharging rate.

11. The system of claim 10, wherein the discharging model module is further configured to use an additional correction amount to increase the discharging rate upon determining that the discharging model module continuously detects that the acceleration of the vehicle or a speed of the vehicle has an amplitude greater than or equal to a reference amplitude.

12. The system of claim 1, wherein the integration module is further configured to feedback the predicted negative pressure of the brake booster to the charging model module and the discharging model module so that the predicted negative pressure is used to determine a charging rate and a discharging rate of a next cycle generated after the current cycle.

13. A system for predicting a negative pressure of a brake booster of a vehicle, the system comprising:
a driving information detector configured to detect driving information related to the vehicle according to driving of the vehicle; and
a controller operatively connected to the driving information detector and configured to determine a negative pressure of an intake manifold according to a pressure of the intake manifold and the driving information including an atmospheric pressure,
wherein the controller is configured to predict the negative pressure of the brake booster by integrating over time a change rate according to a charging rate and a discharging rate of the negative pressure of the brake booster determined using a negative pressure of the brake booster determined in a previous cycle according to a logic for predicting the negative pressure of the brake booster and the negative pressure of the intake manifold of a current cycle and an imitated brake pedal force signal of the current cycle imitating an acceleration of the vehicle and to control an operation of an air conditioner according to the predicted negative pressure of the brake booster, and
wherein the controller is further configured:
to determine a first differential pressure over time using the negative pressure of the brake booster determined in the previous cycle and the negative pressure of the intake manifold of the current cycle;
to take the first differential pressure as a basic factor, and to compensate for the basic factor using the imitated brake pedal force signal to determine a second differential pressure over time; and
to determine the predicted negative pressure of the brake booster using the first differential pressure and the second differential pressure.

14. The system of claim 13, wherein the controller is further configured to generate an acceleration inflection recognition signal by crossing the imitated brake pedal force signal over time and a reference line which is a zero crossing.

15. The system of claim 13, wherein in response that the predicted negative pressure of the brake booster is less than or equal to a reference negative pressure of a control for stopping the operation of the air conditioner of the vehicle, the controller is further configured to stop the operation of the air conditioner.

16. The system of claim 13, wherein the controller is further configured to collect the negative pressure of the intake manifold and the driving information and to generate the negative pressure of the brake booster predicted in a cycle of a time period.

17. The system of claim 13, wherein the controller is further configured to determine the change rate by adding the discharging rate of the negative pressure of the brake booster corresponding to the second differential pressure to the charging rate of the negative pressure of the brake booster corresponding to the first differential pressure.

18. The system of claim 17, wherein the charging rate of the negative pressure of the brake booster according to the first differential pressure is output as a positive value, and the discharging rate of the negative pressure of the brake booster according to the second differential pressure is output as a negative value.

19. The system of claim 17, wherein the controller is further configured to use an additional correction amount according to a repetition frequency of a zero crossing generated upon determining that repeated braking due to an on state and an off state of a brake operation signal continuously occurs to increase the discharging rate.

20. The system of claim 19, wherein the controller is further configured to use an additional correction amount to increase the discharging rate upon determining that the controller continuously detects that the acceleration of the vehicle or a speed of the vehicle has an amplitude greater than or equal to a reference amplitude.

* * * * *